United States Patent
Sherman et al.

(10) Patent No.: US 9,076,472 B1
(45) Date of Patent: Jul. 7, 2015

(54) APPARATUS ENABLING WRITING SERVO DATA WHEN DISK REACHES TARGET ROTATION SPEED

(71) Applicant: Western Digital (Fremont), LLC, Fremont, CA (US)

(72) Inventors: Paul Dylan Sherman, San Jose, CA (US); Sergey Muchiyev, Mountian View, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/464,943

(22) Filed: Aug. 21, 2014

(51) Int. Cl.
*G11B 21/02* (2006.01)
*G11B 5/09* (2006.01)
*G11B 15/46* (2006.01)
*G11B 5/596* (2006.01)
*G11B 19/28* (2006.01)
*G11B 19/04* (2006.01)

(52) U.S. Cl.
CPC ............ *G11B 5/59638* (2013.01); *G11B 19/28* (2013.01); *G11B 5/59661* (2013.01); *G11B 19/04* (2013.01); *G11B 5/59666* (2013.01)

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,078,458 A * | 6/2000 | Fioravanti et al. | 360/73.03 |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |

(Continued)

OTHER PUBLICATIONS

Jianbin Nie, et al., U.S. Appl. No. 13/712,837, filed Dec. 12, 2012, pp. 1-17, 5 sheets drawings.

*Primary Examiner* — Andrew L Sniezek

(57) ABSTRACT

An apparatus is disclosed comprising control circuitry configured to measure a rotation speed of a disk over multiple revolutions of the disk to generate a measured range of rotation speeds, select a target rotation speed from the measured range of rotation speeds, and when the rotation speed of the disk substantially matches the target rotation speed, enable writing of servo data on the disk using a head.

22 Claims, 6 Drawing Sheets

(56) References Cited

U.S. PATENT DOCUMENTS

| | | |
|---|---|---|
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,583,944 B1 * | 6/2003 | Wilson et al. .................. 360/51 |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,205 B1 | 5/2004 | Moran et al. |
| 6,738,220 B1 | 5/2004 | Codilian |
| 6,747,837 B1 | 6/2004 | Bennett |
| 6,751,041 B1 | 6/2004 | Codilian et al. |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,804 B1 | 11/2005 | Codilian |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,477 B2 * | 12/2005 | Bloyer et al. ................. 318/560 |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,143,002 B2 | 11/2006 | Hirano |
| 7,158,329 B1 | 1/2007 | Ryan |
| 7,161,754 B2 | 1/2007 | Hanazawa et al. |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,230,786 B1 | 6/2007 | Ray et al. |
| 7,230,789 B1 | 6/2007 | Brunnett et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |

(56) References Cited

U.S. PATENT DOCUMENTS

| | | |
|---|---|---|
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,387 B2 | 6/2009 | Sun et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,623,313 B1 | 11/2009 | Liikanen et al. |
| 7,626,782 B1 | 12/2009 | Yu et al. |
| 7,630,162 B2 | 12/2009 | Zhao et al. |
| 7,639,446 B2 | 12/2009 | Mizukoshi et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,944,313 B1 | 5/2011 | Ying et al. |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,107,188 B2 | 1/2012 | Lau |
| 8,116,023 B1 | 2/2012 | Kupferman |
| 8,145,934 B1 | 3/2012 | Ferris et al. |
| 8,179,626 B1 | 5/2012 | Ryan et al. |
| 8,184,392 B1 | 5/2012 | Cheung et al. |
| 8,189,286 B1 | 5/2012 | Chen et al. |
| 8,194,343 B1 | 6/2012 | Adler et al. |
| 8,208,216 B1 | 6/2012 | Neos et al. |
| 8,213,106 B1 | 7/2012 | Guo et al. |
| 8,223,452 B1 | 7/2012 | Richgels et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,422,158 B1 | 4/2013 | Cheung et al. |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,482,876 B2 | 7/2013 | Colligan |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,514,511 B1 | 8/2013 | Tran et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |

(56) References Cited

U.S. PATENT DOCUMENTS

| | | |
|---|---|---|
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

US 9,076,472 B1

APPARATUS ENABLING WRITING SERVO DATA WHEN DISK REACHES TARGET ROTATION SPEED

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo controller to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2:
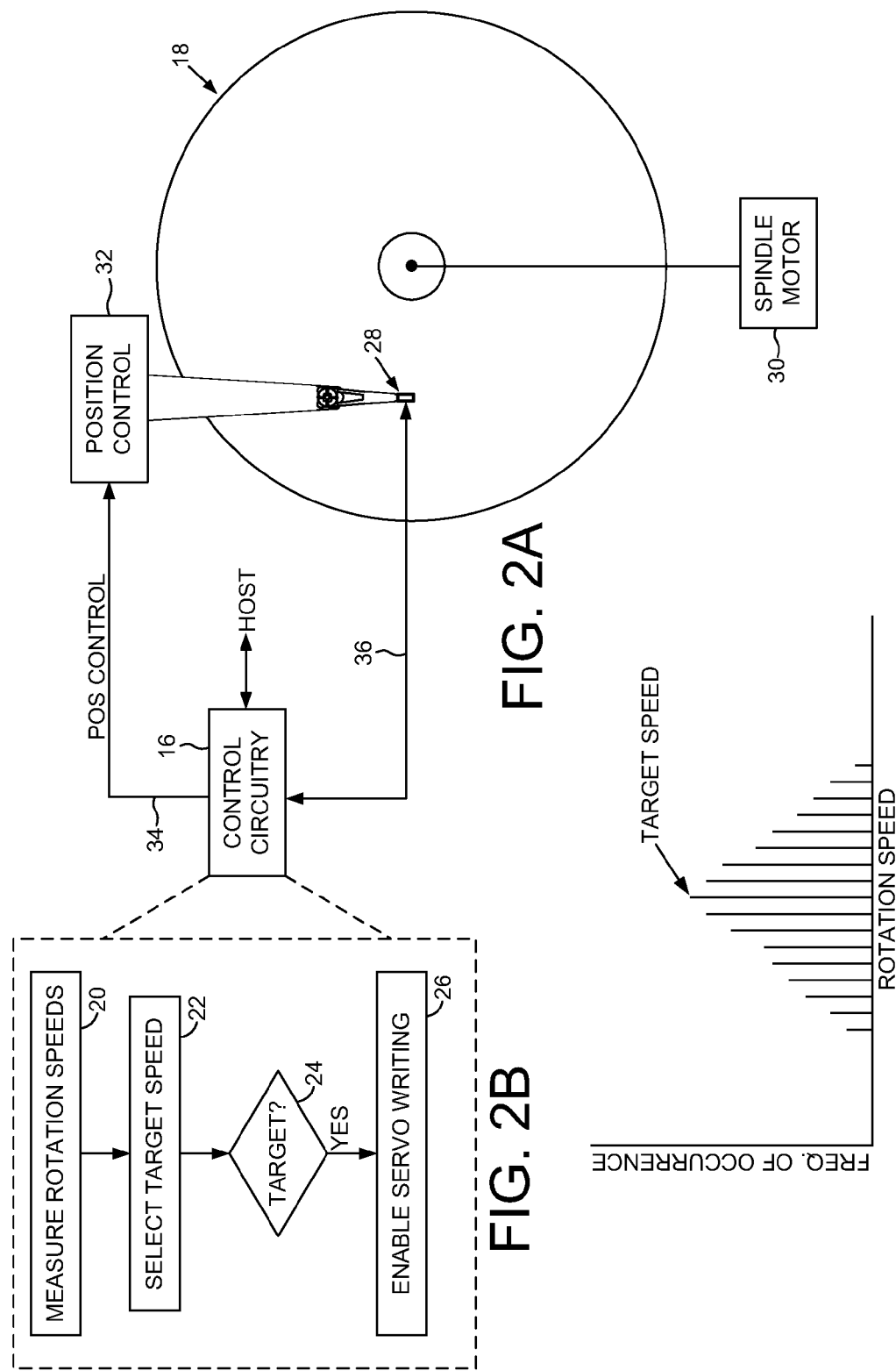
FIG. 2A shows an apparatus according to an embodiment comprising a spindle motor configured to rotate a disk, and a head configured to write servo data to the disk.
FIG. 2B is a flow diagram according to an embodiment wherein servo writing to the disk is enabled when a rotation speed of the disk substantially matches a target rotation speed.
FIG. 2C shows a histogram of the rotation speed of the disk, wherein in one embodiment the target rotation speed is based on a median rotation speed.

FIG. 2A shows an apparatus according to an embodiment comprising control circuitry 16 configured to execute the flow diagram of FIG. 2B, wherein a rotation speed of a disk 18 is measured over multiple revolutions of the disk (block 20) to generate a measured range of rotation speeds. A target rotation speed is selected from the measured range of rotation speeds (block 22), and when the rotation speed of the disk substantially matches the target rotation speed (block 24), enable writing of servo data on the disk (block 26) using a head 28.

In the embodiment of FIG. 2A, the apparatus comprises a spindle motor 30 configured to rotate the disk 18. The apparatus further comprising a position control system 32 configured to position the head 28 radially over the disk 18 in response to a position control signal 34 generated by the control circuitry 16. The control circuitry 16 generates a write signal 36 applied to the head 28 in order to write servo data to the disk when the rotation speed of the disk 18 substantially matches the target rotation speed. In one embodiment, the apparatus shown in FIG. 2A may comprise a disk drive wherein the position control system 32 may comprise a suitable voice coil motor (VCM). The control circuitry 16 within the apparatus may comprise a control system for controlling the rotation speed of the spindle motor 30 when writing the servo data to the disk 18, as well as during normal access operations (write/read operations). In another embodiment, the apparatus shown in FIG. 2A may comprise a test system such as a suitable spin stand, wherein the position control system 32 may comprise a VCM or other suitable actuator, such as a linear actuator. The test system may utilize a spindle motor and corresponding control system different from that employed in a disk drive. For example, the spindle motor 30 of the test system may comprise a much larger motor having significantly more momentum than a typical spindle motor employed in a disk drive.

Figure 1:
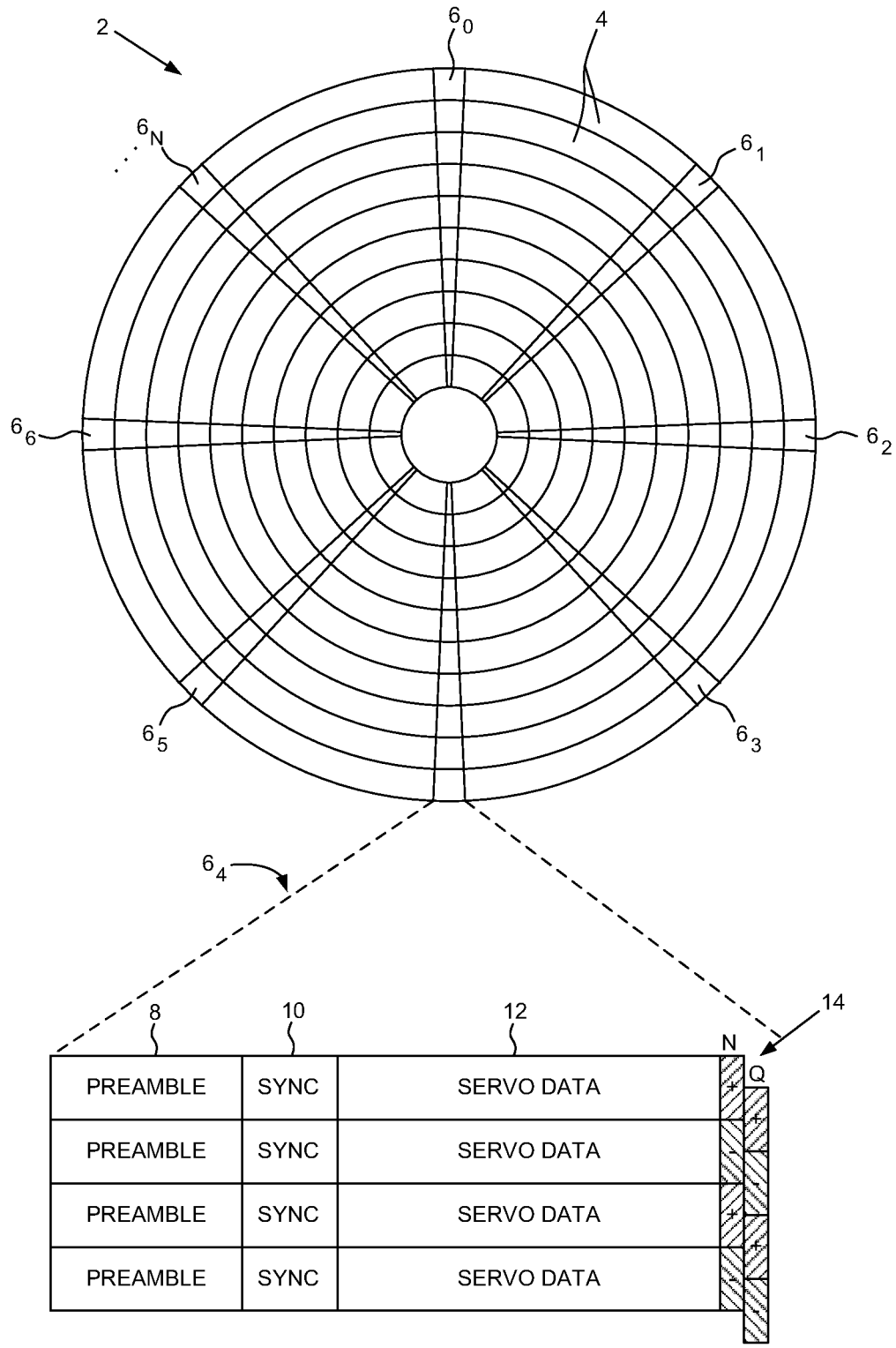
FIG. 1 shows a prior art disk format comprising a plurality of servo tracks defined by servo sectors.

In one embodiment, the control circuitry 16 measures the rotation speed of the disk 18 over multiple revolutions of the disk using any suitable technique, such as by monitoring the back electromotive force (BEMF) voltage generated by the spindle motor, or by reading a reference pattern from the disk using the head 28. For example, in one embodiment the disk 18 may comprise a concentric reference pattern which may be substantially continuous or periodic, such as periodic, concentric servo sectors as shown in FIG. 1. In one embodiment, the reference pattern may be written at a predetermined radial location, such as near an outer diameter of the disk 18. In yet another embodiment, the apparatus in FIG. 2A may comprise a suitable optical encoder for measuring the rotation speed of the disk 18.

Regardless as to how the rotation speed of the disk 18 is measured, in one embodiment the control circuitry 16 measures the rotation speed over multiple revolutions of the disk in order to generate a histogram of rotations speeds such as shown in FIG. 2C. In the example of FIG. 2C, the histogram comprises a substantially Gaussian distribution about a median value. That is, the rotation speed of the disk in this example will most likely be near the median value, but may vary from the median value due to imperfections in the spindle motor 30 and or sub-optimal performance of the spindle motor control system. In one embodiment, the control circuitry 16 selects the median value as the target rotation speed, and then enables writing of servo data on the disk when the measured rotation speed of the disk 18 substantially matches the target rotation speed. Waiting until the rotation speed substantially matches the median rotation speed increases the probability that the rotation speed will remain substantially constant (near the median rotation speed) while writing the servo data to the disk. If the measured rotation speed deviates away from the target rotation speed (e.g., median rotation speed), the control circuitry may temporarily disable the writing of servo data until the measured rotation speed reverts back to the target rotation speed.

Figure 3:
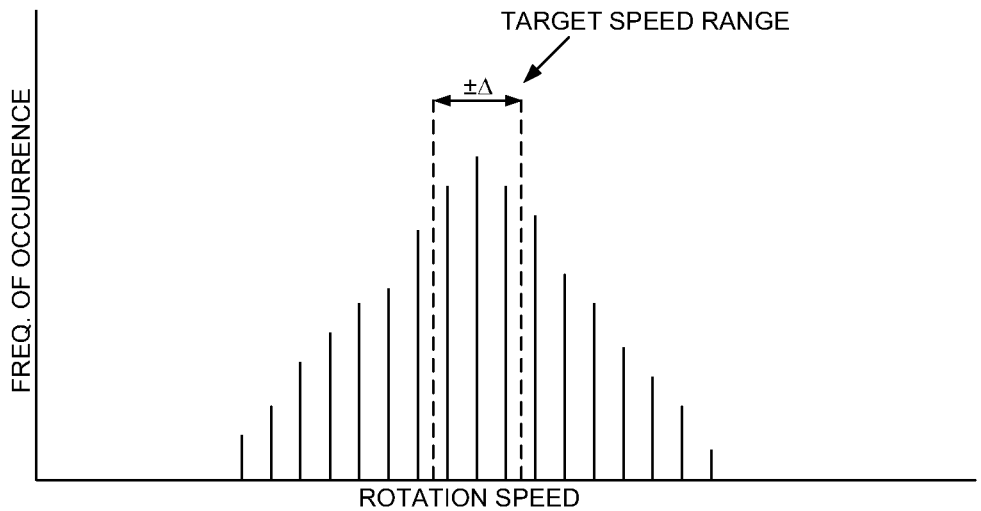
FIG. 3 shows an embodiment wherein the target rotation speed is based on a predetermined delta from the median rotation speed.

FIG. 3 shows an embodiment wherein the control circuitry may wait until the measured rotation speed of the disk is within a predetermined delta from the median rotation speed. That is, the writing of servo data may be enabled until the measured rotation speed falls outside the range defined by the delta as shown in FIG. 3. Any suitable delta may be employed, and in one embodiment, the delta may be configured based on a standard deviation or other statistical measure of the histogram. For example, the delta may be configured proportional to the standard deviation such that a higher standard deviation may correspond to a larger delta.

Figure 4:
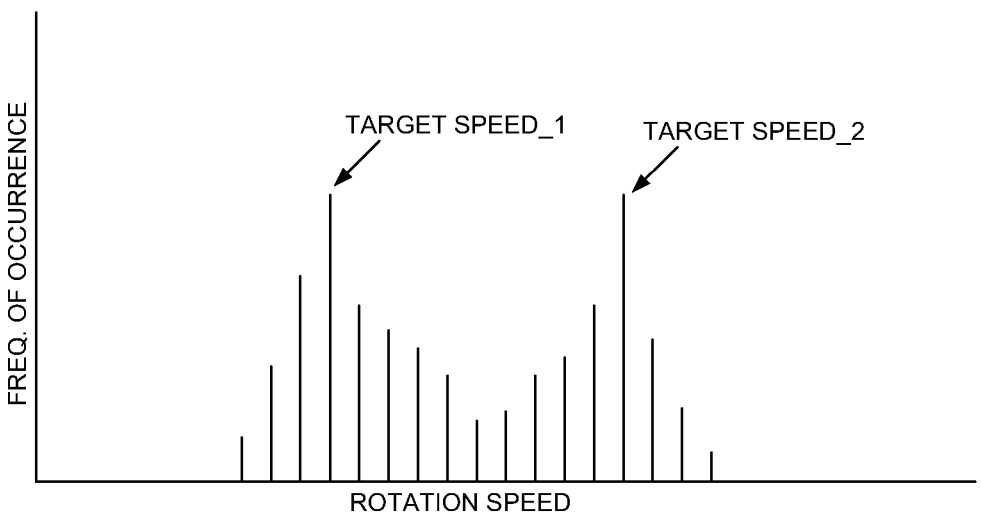
FIG. 4 shows an embodiment wherein the histogram of rotation speeds may comprise two or more peaks, and the target rotation speed may correspond to either of the peaks.

FIG. 4 shows an embodiment wherein the histogram of measured rotation speeds may comprise multiple peaks meaning that the rotation speed will most likely be near one of the peaks. In one embodiment, the control circuitry may enable the writing of servo data to the disk when the measured rotation speed of the disk substantially matches one of the peaks shown in FIG. 4. This embodiment may help reduce the servo writing time by enabling the servo writing at multiple target rotation speeds as opposed to one target rotation speed. In one embodiment, the writing of the servo data may be modified based on which target rotation speed the measured rotation speed is near at the time of the servo writing. For example, in an embodiment described below, the servo data may comprise a spiral track written to the disk while moving the head radially over the disk at a constant radial velocity, where the radial velocity for writing the spiral servo track may be modified based on the target rotation speed of the disk. For example, when the measured rotation speed substantially matches the lower target rotation speed (TARGET SPEED_1) in FIG. 4, there may be a corresponding reduction in the radial velocity of the head when writing a spiral track as compared to when the measured rotation speed substantially matches the higher target rotation speed (TARGET SPEED_2). In this manner, each spiral track written will be written with essentially the same spiral shape (i.e., with the same target slope).

In one embodiment, a fixed system clock is generated at a fixed frequency which is used to write the servo data to the disk. For example, in one embodiment the fixed system clock may time when to begin writing the servo data, and/or the fixed system clock may determine the data rate of the servo data written to the disk. Writing the servo data based on a fixed system clock avoids the cross-talk errors in attempting to synchronize a system clock to the rotation speed of the disk. That is, fluctuations in the rotation speed of the disk due to the transients in the spindle motor control may interfere with a phase-locked loop that attempts to synchronize a system clock to the rotation speed of the disk. Accordingly in one embodiment, instead of synchronizing a system clock to the rotation speed of the disk, the control circuitry waits until the rotation speed of the disk substantially matches a target rotation speed (e.g., median rotation speed), and then writes the servo data to the disk without needing a synchronized system clock.

Figure 5:
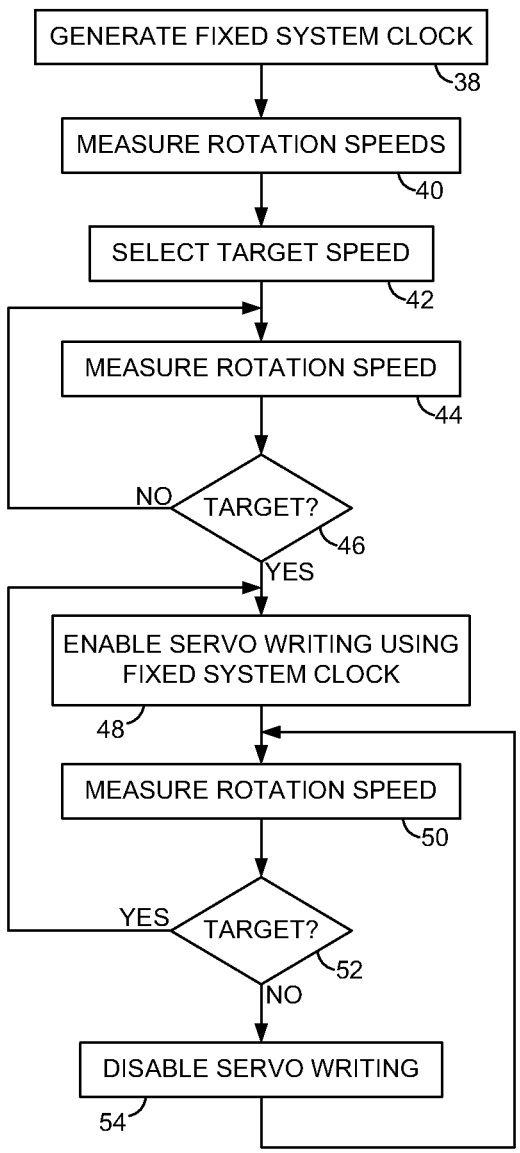
FIG. 5 is a flow diagram according to an embodiment wherein a fixed system dock is used to write the servo data on the disk when the measured rotation speed of the disk substantially matches the target rotation speed.

FIG. 5 is a flow diagram that illustrates an example of this embodiment wherein a fixed system clock is generated at a target frequency (block 38), for example, using a suitable frequency synthesizer. In one embodiment, the target frequency of the fixed system clock may be generated based on the target rotation speed of the disk, and the target frequency may be adjusted if the target rotation speed changes (e.g., as described above with reference to FIG. 4). After generating the histogram of rotation speeds (block 40) and selecting the target rotation speed (block 42), the rotation speed of the disk is measured (block 44). When the measured rotation speed substantially matches the target rotation speed (block 46), the writing of servo data on the disk is enabled using the fixed system clock (block 48). The rotation speed is periodically measured (block 50), and if the measured rotation speed deviates from the target rotation speed (block 52), the writing of servo data on the disk is temporarily disabled (block 54) until the measured rotation speed reverts back to substantially match the target rotation speed.

In one embodiment, the control circuitry may synchronize a system clock to the rotation speed of the disk when the measured rotation speed substantially matches the target rotation speed (or is within the delta described above with reference to FIG. 3). This embodiment may help compensate for minor variations of the rotation speed from the target rotation speed without significantly interfering with the phase-locked loop that synchronizes the system clock. When the measured rotation speed deviates from the target rotation speed, the servo writing and the phase-locked loop may be disabled (e.g., frozen) until the rotation speed reverts to the target rotation speed.

Figure 6:
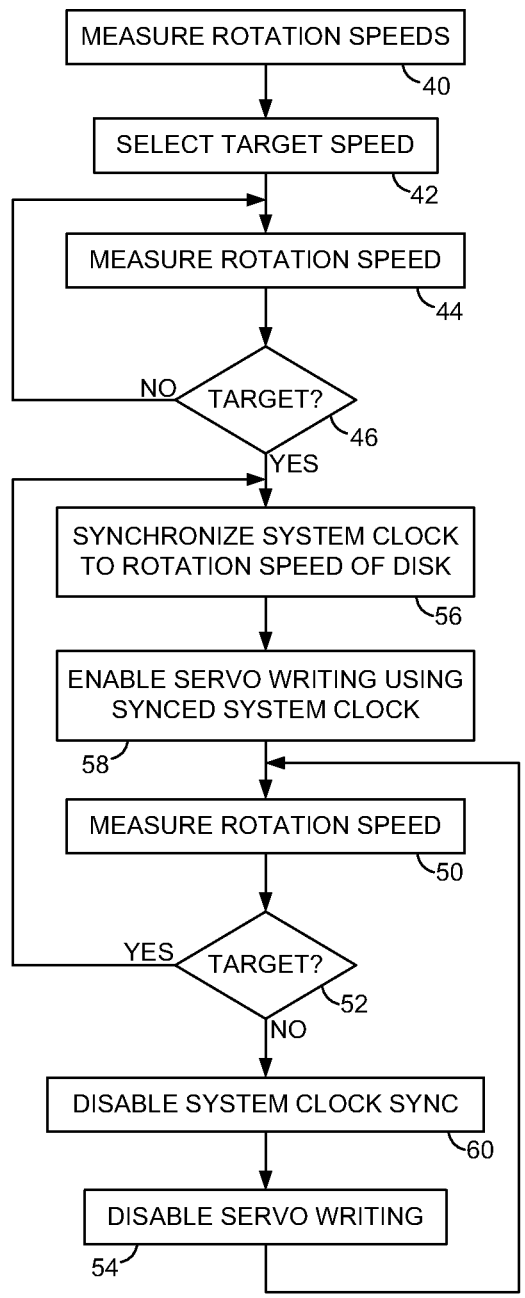
FIG. 6 is a flow diagram according to an embodiment wherein a system dock is synchronized to a rotation of the disk when the measured rotation speed substantially matches the target rotation speed, and the synchronized system dock is used to write servo data to the disk.

FIG. 6 is a flow diagram that illustrates an example of this embodiment wherein when the measured rotation speed substantially matches the target rotation speed (block 46), synchronizing the system clock to the rotation speed is enabled (block 56), such as by enabling a suitable phase-locked loop. Writing the servo data on the disk using the synchronized system clock is also enabled (block 58). When the measured rotation speed of the disk deviates from the target rotation speed (block 52), the synchronizing of the system clock is disabled (block 60) so that the spindle motor control system does not interfere with the operation of the phase-locked loop. When the measured rotation speed reverts back to the target rotation speed, the synchronizing of the system clock is enabled (block 56).

Figure 7A:
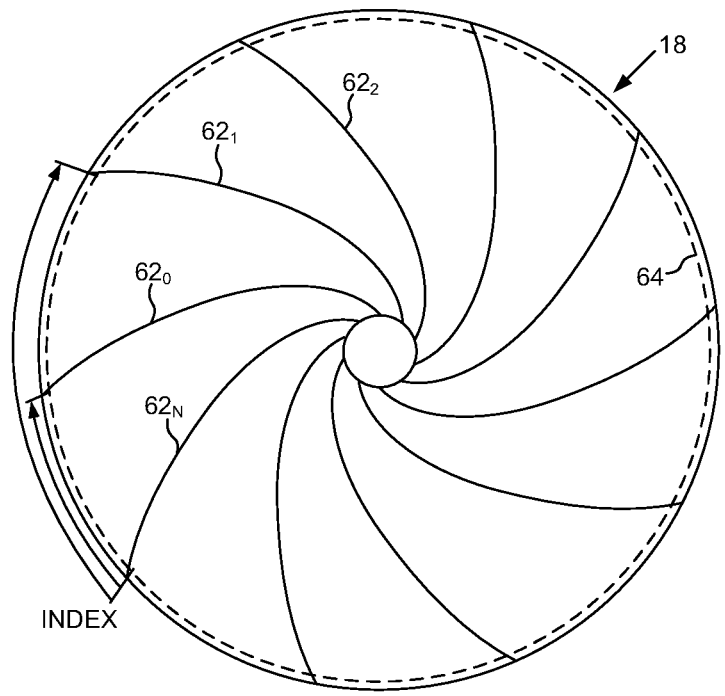
FIG. 7A shows an embodiment wherein the servo data written to the disk may comprise a plurality of spiral tracks.
Figure 7B:
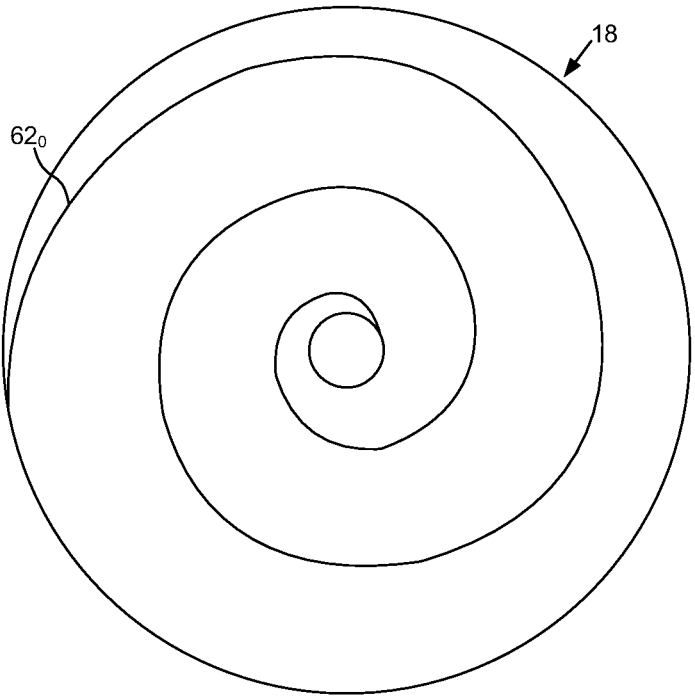
FIG. 7B shows an embodiment wherein each spiral track may be written over multiple revolutions of the disk.

The control circuitry may write any suitable servo data on the disk when the servo writing is enabled. In one embodiment, the control circuitry writes a plurality of spiral tracks $62_0$-$62_N$ to the disk 18 as illustrated in the example of FIG. 7A. Each spiral track is written by moving the head radially over the disk 18 (e.g., from the outer to inner diameter) at a substantially constant radial velocity. Each spiral track may be written using any suitable pattern, such as high frequency signal periodically interrupted by a sync mark. In the embodiment of FIG. 7A, each spiral track is written over a partial revolution of the disk, whereas in an embodiment shown in FIG. 7B, each spiral track may be written over multiple revolutions of the disk. In one embodiment, the spiral tracks $62_0$-$62_N$ may be used as a final servo pattern for servoing the head over the disk during normal operation of the disk drive (e.g., write/read operations). In another embodiment, the spiral tracks $62_0$-$62_N$ may be used as an intermediate servo pattern that may be used to write a final servo pattern on the disk, such as concentric servo sectors as shown in FIG. 1.

It is typically desirable to servo write the spiral tracks $62_0$-$62_N$ so as to have an equal spacing from one another as well as have a constant spiral shape across the spiral tracks. In one embodiment, the system clock (fixed or synchronized) is used to time when to begin writing each spiral track as the disk rotates. For example, when the head reaches an index location on the disk as shown in FIG. 7A, the writing of spiral track $62_0$ may be enabled when the system clock reaches a target value relative to the index. That is, the head may be launched from the outer diameter toward the inner diameter in order to write spiral track $62_0$ when the system clock reaches a target offset from the index. The head may be repositioned at the outer diameter and the next spiral track $62_1$ written when the system clock reaches the next target offset from the index. This process is repeated until all of the spiral tracks $62_0$-$62_N$ have been written. If the measured rotation speed of the disk deviates from the target rotation speed during this process, the servo writing is temporarily disabled until the measured rotation speed reverts back to the target rotation speed.

In one embodiment, a reference pattern 64 may be written near the outer diameter of the disk 18, such as a plurality of concentric servo sectors. The reference pattern 64 may be used to servo the head near the outer diameter as well as synchronize the system clock to the rotation speed of the disk as described above with reference to FIG. 6. If the measured rotation speed of the disk deviates from the target rotation speed, the synchronizing of the system clock is temporarily disabled until the measured rotation speed reverts back to the target rotation speed.

In one embodiment, the measured rotation speed of the disk may drift slightly around the target rotation speed during the process of writing the spiral track $62_0$-$62_N$ to the disk. The small error in the rotation speed relative to the frequency of the system clock may result in an accumulated spacing error between the spiral tracks $62_0$-$62_N$ shown in FIG. 7A. In one embodiment, in order to compensate for this accumulated spacing error, the control circuitry may write the spiral tracks $62_0$-$62_N$ in a random sequence rather than sequentially writing the spiral tracks from 0-N. In this manner, the spacing error is distributed across the spiral tracks thereby reducing the maximum spacing error between any two of the spiral tracks.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. An apparatus comprising control circuitry configured to:
   measure a rotation speed of a disk over multiple revolutions of the disk to generate a measured range of rotation speeds;
   select a target rotation speed from the measured range of rotation speeds; and
   when the rotation speed of the disk substantially matches the target rotation speed, enable writing of servo data on the disk using a head,
   wherein the target rotation speed is based on a median rotation speed within the measured range of rotation speeds.

2. The apparatus as recited in claim 1, wherein the target rotation speed is based on a predetermined delta from the median rotation speed.

3. The apparatus as recited in claim 1, wherein the servo data comprises a spiral track.

4. The apparatus as recited in claim 1, wherein the control circuitry is further configured to:
   generate a system clock at a frequency based on the target rotation speed; and
   write the servo data on the disk based on the system clock.

5. The apparatus as recited in claim 4, wherein the system clock is a fixed clock.

6. The apparatus as recited in claim 4, wherein when the rotation speed of the disk substantially matches the target rotation speed, the control circuitry is further configured to synchronize the system clock to the rotation speed of the disk.

7. The apparatus as recited in claim 6, wherein when the rotation speed of the disk deviates from the target rotation speed, the control circuitry is further configured to disable the synchronizing of the system clock to the rotation speed of the disk.

8. The apparatus as recited in claim 4, wherein the servo data comprises a spiral track.

9. The apparatus as recited in claim 8, wherein the control circuitry is further configured to begin writing the spiral track when the system clock reaches a target value.

10. A method of writing servo data on a disk, the method comprising:
    measuring a rotation speed of the disk over multiple revolutions of the disk to generate a measured range of rotation speeds;
    selecting a target rotation speed from the measured range of rotation speeds; and
    when the rotation speed of the disk substantially matches the target rotation speed, enabling writing of servo data on the disk using a head,
    wherein the target rotation speed is based on a median rotation speed within the measured range of rotation speeds.

11. The method as recited in claim 10, wherein the target rotation speed is based on a predetermined delta from the median rotation speed.

12. The method as recited in claim 10, wherein the servo data comprises a spiral track.

13. The method as recited in claim 10, further comprising:
    generating a system clock at a frequency based on the target rotation speed; and
    writing the servo data on the disk based on the system clock.

14. The method as recited in claim 13, wherein the system clock is a fixed clock.

15. The method as recited in claim 13, wherein when the rotation speed of the disk substantially matches the target rotation speed, the method further comprises synchronizing the system clock to the rotation speed of the disk.

16. The method as recited in claim 15, wherein when the rotation speed of the disk deviates from the target rotation speed, the method further comprises disabling the synchronizing of the system clock to the rotation speed of the disk.

17. The method as recited in claim 13, wherein the servo data comprises a spiral track.

18. The method as recited in claim 17, further comprising beginning writing the spiral track when the system clock reaches a target value.

19. An apparatus comprising control circuitry configured to:
    measure a rotation speed of a disk over multiple revolutions of the disk to generate a measured range of rotation speeds;
    select a target rotation speed from the measured range of rotation speeds;
    when the rotation speed of the disk substantially matches the target rotation speed, synchronize a system clock to the rotation speed of the disk and enable writing of servo data on the disk using a head;
    when the rotation speed of the disk deviates from the target rotation speed, disable the synchronizing of the system clock to the rotation speed of the disk; and
    write the servo data on the disk based on the system clock.

20. An apparatus comprising control circuitry configured to:
    measure a rotation speed of a disk over multiple revolutions of the disk to generate a measured range of rotation speeds;
    select a target rotation speed from the measured range of rotation speeds;
    generate a fixed system clock at a frequency based on the target rotation speed;
    when the rotation speed of the disk substantially matches the target rotation speed, enable writing of servo data on the disk using a head; and
    write the servo data on the disk based on the fixed system clock.

21. A method of writing servo data on a disk, the method comprising:
    measuring a rotation speed of the disk over multiple revolutions of the disk to generate a measured range of rotation speeds;
    selecting a target rotation speed from the measured range of rotation speeds;
    when the rotation speed of the disk substantially matches the target rotation speed, synchronizing a system clock to the rotation speed of the disk and enabling writing of servo data on the disk using a head;
    when the rotation speed of the disk deviates from the target rotation speed, disabling the synchronizing of the system clock to the rotation speed of the disk; and
    writing the servo data on the disk based on the system clock.

22. A method of writing servo data on a disk, the method comprising:
    measure a rotation speed of the disk over multiple revolutions of the disk to generate a measured range of rotation speeds;
    selecting a target rotation speed from the measured range of rotation speeds;
    generating a fixed system clock at a frequency based on the target rotation speed;
    when the rotation speed of the disk substantially matches the target rotation speed, enabling writing of servo data on the disk using a head; and
    writing the servo data on the disk based on the fixed system clock.

* * * * *